A. DIANA.
WHEEL PROTECTOR.
APPLICATION FILED APR. 14, 1920.

1,374,065.

Patented Apr. 5, 1921.
2 SHEETS—SHEET 1.

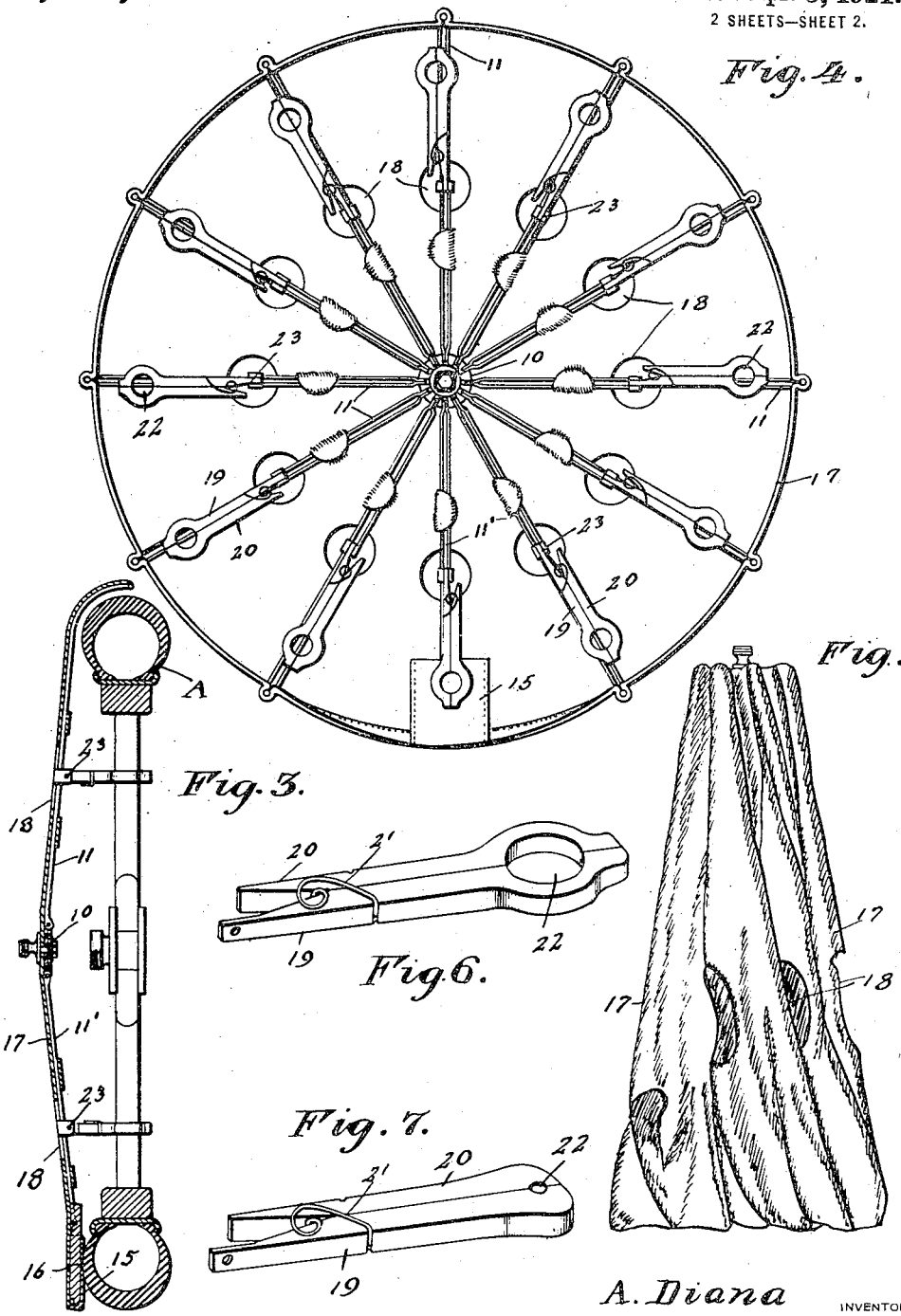

UNITED STATES PATENT OFFICE.

ALEXANDER DIANA, OF SAN FRANCISCO, CALIFORNIA.

WHEEL-PROTECTOR.

1,374,065. Specification of Letters Patent. Patented Apr. 5, 1921.

Application filed April 14, 1920. Serial No. 373,945.

*To all whom it may concern:*

Be it known that I, ALEXANDER DIANA, a citizen of the United States, residing at San Francisco, in the county of San Francisco and State of California, have invented new and useful Improvements in Wheel-Protectors, of which the following is a specification.

This invention comprehends the provision of an automobile attachment, in the form of a shield to protect both the wheel and the tire, from the bad effects of the heat from the sun. In the summer months when a motor vehicle is allowed to stand for an appreciable length of time, the heat from the sun causes a shrinkage of the wood part of the wheel which results in the looseness of the spokes, and also has a bad effect directly upon the tires, as the heat not only has a tendency to burn the tire, but causes expansion of the air which frequently results in a blowout.

It is therefore the purpose of this invention, to provide a shield which is arranged on the outside of the wheel and shields both the wheel and the tire, to protect these parts from the sun and the heat, the construction being such that it can be readily and quickly applied to the wheel or removed therefrom as the occasion requires.

Another object of the invention resides in the provision of a shield of the above mentioned character, which when removed from the wheel can be folded compactly, so as to occupy a minimum of space in an appropriate part of the machine.

The nature and advantages of the invention will be better understood, when the following details of construction, are taken in connection with the accompanying drawings, the invention residing in the construction, combination and arrangement of parts as claimed.

In the drawings forming part of this application, like numerals of reference indicate similar parts in the several views, and wherein:—

Fig. 3 is a vertical sectional view taken on line 3—3 of Fig. 1.

Fig. 4 is an inside plan view of the shield.

Fig. 5 is a view showing the shield folded.

Fig. 6 is a detail view of one of the clamping elements.

Fig. 7 is a similar view of another form of clamp.

Figure 1:
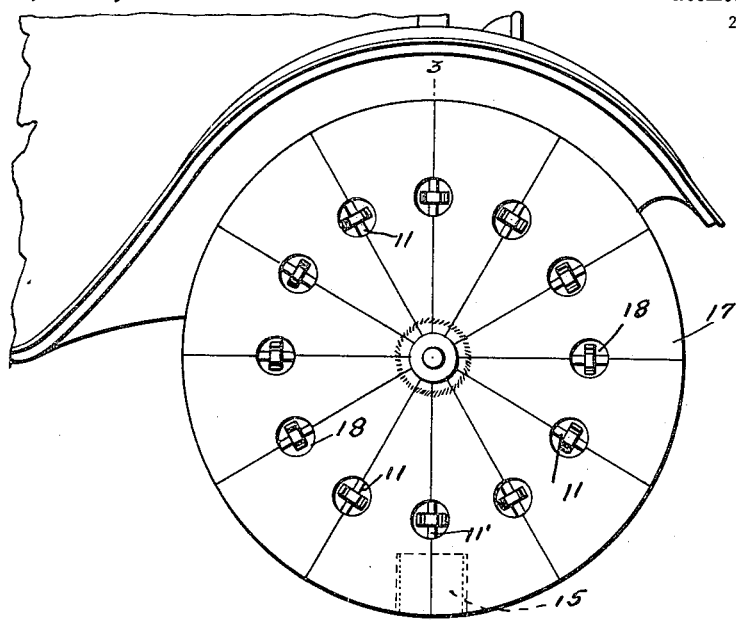
Figure 1 is a view showing the shield applied to a wheel.
Figure 2:
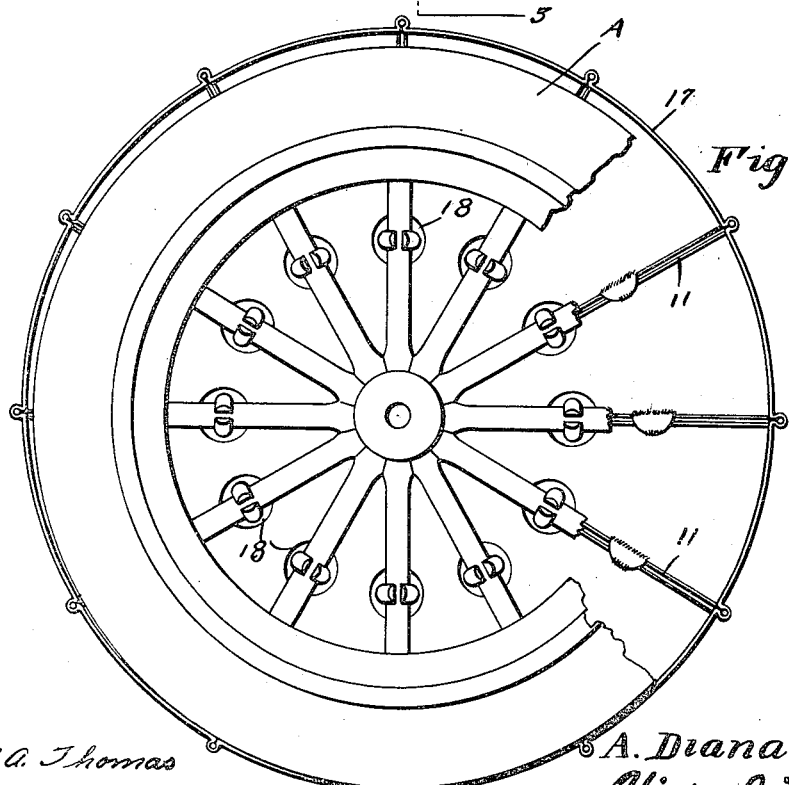
Fig. 2 is a similar view looking from the opposite side of the wheel.

The shield forming the subject matter of my invention when in use has the general appearance of an umbrella top, and includes an annulus 10 from which radiates a plurality of ribs 11 the latter having their corresponding ends pivotally mounted upon the annulus 10 and suitably spaced apart. Any number of ribs may be employed in the production of the shield, this depending upon the size of the wheel to be accommodated. The ribs 11 are covered by the body of the shield, which by preference is of a flexible material of any suitable character. The shield is adapted to be arranged on the outside of the wheel, and the outer ends of the respective ribs are curved inwardly to overlie a portion of the tire A, and in spaced relation thereto as shown in Figs. 2 and 3. One of the ribs 11' is relatively short as compared to the length of the other ribs, so as not to contact with the ground when the shield is in use. This obviously provides for slackness of the adjacent portion of the shield, which is formed with a pocket 15 for the reception of a weight 16. The latter manifestly holds the lower edge of a shield against the ground to protect the adjacent part of the wheel and tire. The covering above mentioned is indicated at 17 and is provided with a circumferential series of openings 18, each being of a size to extend beyond the opposite sides of the adjacent rib. These openings 18 permit of the insertion of the fingers therethrough to manipulate the clamping elements utilized to hold the shield positioned upon the wheel. These clamps are of the construction illustrated in Figs. 6 and 7.

Each clamp includes two members 19 and 20 respectively which are associated for movement toward and away from each other through the instrumentality of a spring 21. The corresponding outer ends of the respective members are curved to unitedly define a spoke receiving opening 22. This opening in the clamp shown in Fig. 6 is of a size to accommodate a wooden spoke while the opening 22 of the clamp shown in Fig. 7 is of a size to accommodate a wire spoke. The members 19 of the clamps are slightly longer than the members 20, and have one end pivoted as at 23 to the adjacent rib. The clamps are thus always attached to the shield for the convenience of the user.

When use of the shield is desired, the ribs 11 and 11' are swung upon their pivots to extended position as shown in Fig. 4. The respective members of each clamp are spread apart to receive the adjacent spoke of the wheel, and in this manner the shield is supported upon the wheel. In associating the shield with the wheel, care must be exercised to position the weight 16 to contact the ground shown in both Figs. 3 and 4. With the shield in position for use, the openings 18 together with the fact that the shield is spaced from the periphery of the tire, provides for a circulation of air about the wheel. Subsequent to the removal of the shield the latter is collapsed in a manner similar to an umbrella, with all the clamps arranged on the inside, thus producing a comparatively small article as can be conveniently carried in the machine, occupying a minimum space.

While it is believed that from the foregoing description the nature and advantages of the invention will be readily apparent, I desire to have it understood that I do not limit myself to the details herein shown and described, and that such changes may be resorted to when desired as fall within the scope of what is claimed.

What I claim is:—

1. A shield for wheels comprising an annulus, a plurality of radially disposed elements having corresponding extremities pivoted on said annulus, a flexible covering for said elements, means for supporting the shield upon the wheel at one side thereof, a pocket in said shield and a weight arranged in said pocket for the purpose specified.

2. A shield for wheels comprising a central member, a plurality of radially disposed elements having corresponding ends pivoted on said member, a flexible covering secured to said elements, clamps carried by said elements and adapted to support the shield upon the wheel at one side thereof, and said flexible covering having a hand receiving opening adjacent each of said clamps.

3. A shield for wheels comprising a central member, radially disposed elements pivoted upon said member, a flexible covering secured to said elements, clamps carried by said elements and designed to engage the spokes of the wheels for supporting the shield at one side thereof, said shield being designed to partly cover the wheel and tire thereof, and a circumferential series of hand openings arranged opposite said clamps.

4. A shield for wheels comprising a central member, radially disposed elements pivoted on said member, a flexible covering secured to said elements, a plurality of clamps, including pivoted members having an opening to receive the element upon which it is supported and a spoke receiving opening whereby said clamps support the shield upon the wheel at one side thereof, and said covering having a hand receiving opening opposite each clamp.

5. A wheel attachment comprising a central member, radially disposed elements pivoted on said member, a flexible covering secured to said elements, means carried by the elements and designed to support the shield upon the wheel at one side thereof, said covering having hand receiving openings opposite said clamps, a pocket formed in said covering, and a weight arranged in said pocket for the purpose specified.

In testimony whereof I affix my signature.

ALEXANDER DIANA.